US009229866B2

(12) United States Patent
Kannan et al.

(10) Patent No.: US 9,229,866 B2
(45) Date of Patent: Jan. 5, 2016

(54) DELAYING CACHE DATA ARRAY UPDATES

(71) Applicant: Apple Inc., Cupertino, CA (US)

(72) Inventors: Hari S. Kannan, Sunnyvale, CA (US);
Brian P. Lilly, San Francisco, CA (US);
Perumal R. Subramoniam, San Jose, CA (US); Pradeep Kanapathipillai, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 224 days.

(21) Appl. No.: 14/089,014

(22) Filed: Nov. 25, 2013

(65) Prior Publication Data

US 2015/0149722 A1 May 28, 2015

(51) Int. Cl.
*G06F 12/08* (2006.01)

(52) U.S. Cl.
CPC ........ *G06F 12/0811* (2013.01); *G06F 12/0842* (2013.01); *G06F 12/0857* (2013.01); *G06F 12/0888* (2013.01)

(58) Field of Classification Search
CPC .............. G06F 12/0811; G06F 12/084; G06F 12/0842; G06F 12/0857; G06F 12/0888
See application file for complete search history.

(56) References Cited

U.S. PATENT DOCUMENTS

| 8,145,848 | B2 | 3/2012 | Jain et al. | |
|---|---|---|---|---|
| 2008/0301373 | A1* | 12/2008 | Harada | G06F 12/121 711/133 |
| 2009/0106495 | A1* | 4/2009 | Chou | G06F 9/3004 711/130 |
| 2010/0325367 | A1 | 12/2010 | Kornegay et al. | |
| 2011/0276760 | A1 | 11/2011 | Chou | |
| 2013/0166846 | A1 | 6/2013 | Gaur et al. | |
| 2014/0181412 | A1* | 6/2014 | Thottethodi | G06F 12/0848 711/133 |

* cited by examiner

*Primary Examiner* — Hiep Nguyen
(74) *Attorney, Agent, or Firm* — Rory D. Rankin; Meyertons, Hood, Kivlin, Kowert & Goetzel, P.C.

(57) ABSTRACT

Systems, methods, and apparatuses for reducing writes to the data array of a cache. A cache hierarchy includes one or more L1 caches and a L2 cache inclusive of the L2 cache(s). When a request from the L1 cache misses in the L2 cache, the L2 cache sends a fill request to memory. When the fill data returns from memory, the L2 cache delays writing the fill data to its data array. Instead, this cache line is written to the L1 cache and a clean-evict bit corresponding to the cache line is set in the L1 cache. When the L1 cache evicts this cache line, the L1 cache will write back the cache line to the L2 cache even if the cache line has not been modified.

20 Claims, 9 Drawing Sheets

DELAYING CACHE DATA ARRAY UPDATES

BACKGROUND

1. Field of the Invention

The present invention relates generally to data caches, and in particular to methods and mechanisms for delaying data writes to a data cache.

2. Description of the Related Art

Modern day mobile electronic devices often include multiple components or agents sharing access to one or more memory devices. These multiple agents may make large numbers of requests to memory, and as the number of these requests increases, the power consumption of the device increases, which limits the battery life of the device. One approach for reducing power consumption is to try to reduce the number of times that off-chip memory is accessed by caching data in or near the requesting agent.

Conventional caches are typically coupled to or nearby an agent and store data that is frequently accessed by the agent to reduce latency. For example, processor cores often include caches and may also be coupled to additional external caches in a cache memory hierarchy. For example, in a system with a two-level cache hierarchy, a level two (L2) cache may be inclusive of one or more write-back level one (L1) caches. Typically, a request from a core that misses in the L2 cache will bring the corresponding cache line from memory into the L2 cache data array, update the state of the L2 cache, and then update the L1 cache. If the core subsequently dirties the line, the L2 data array will be updated yet again when the line is evicted from the core. Therefore, the first write to the L2 data array was unnecessary and contributes to increased power consumption.

SUMMARY

Systems, apparatuses, and methods for reducing the power consumption of a cache are disclosed.

In one embodiment, a system may include one or more level one (L1) caches and a L2 cache. When a request from a L1 cache misses in the L2 cache, the L2 cache may issue a fill request to memory. When the corresponding cache line returns from memory, the L2 cache may be configured to delay an update to the L2 data array until the point of victimization of the cache line from the L1 cache. The cache line may be written to the L1 cache and the L2 cache may convey information to the L1 cache that the cache line needs to be written to the L2 cache when the cache line is evicted from the L1 cache.

In one embodiment, the L1 cache may include a clean-evict bit for each cache line. If the clean-evict bit is set, this indicates that the L1 cache must write the victim back to the L2 cache, irrespective of the victim's dirty status. The clean-evict bit may be set when the L2 cache notifies the L1 cache that a cache fill to the L1 cache of a missing cache line has not been written to the L2 cache. In effect, the L2 cache is speculating that the L1 cache will dirty the cache line and thus an initial write of the cache line to the L2 cache is unnecessary and wastes power.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
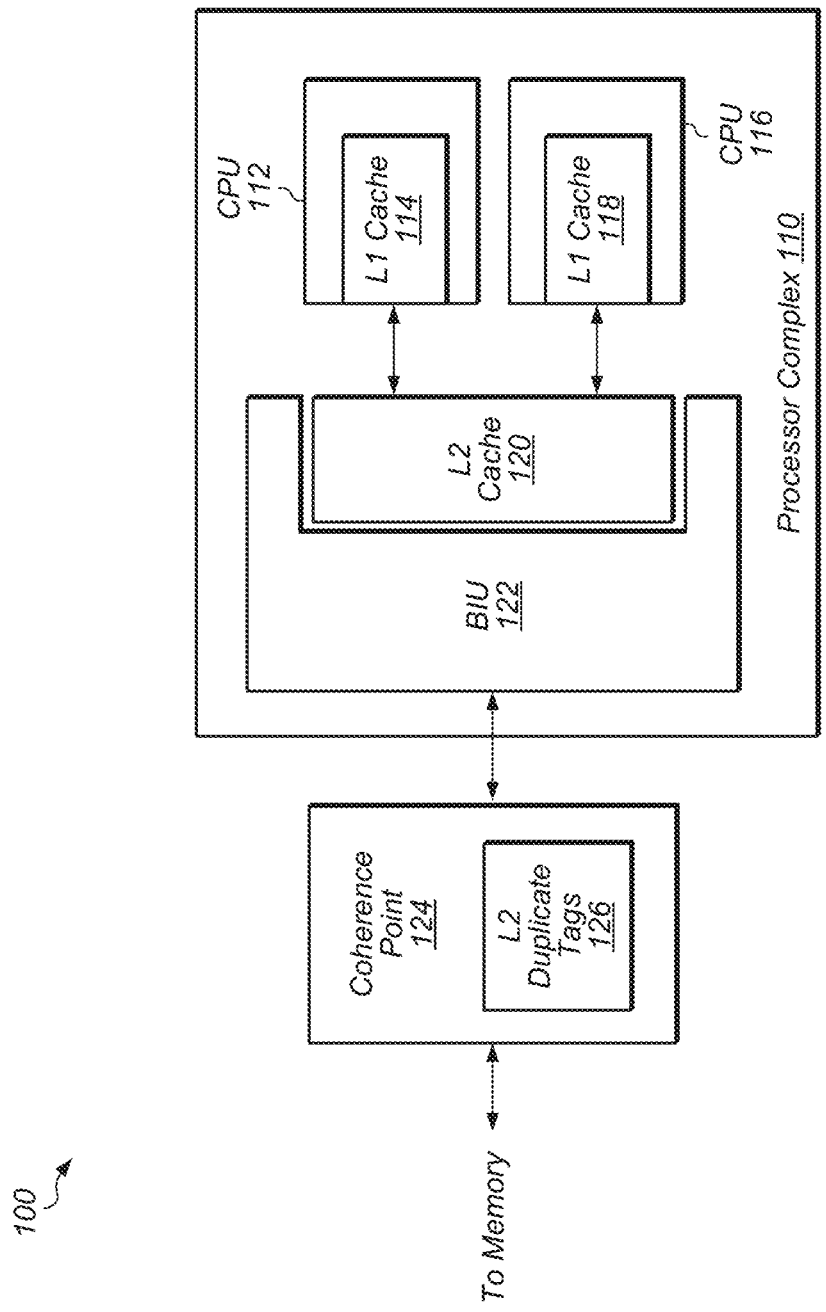
FIG. 1 is a block diagram that illustrates one embodiment of a portion of an integrated circuit.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a first cache . . . ." Such a claim does not foreclose the system from including additional components (e.g., a processor complex, a coherence point, a GPU).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a cache with a plurality of cache lines, the terms "first" and "second" cache lines can be used to refer to any two of the plurality of cache lines. In another example, the terms "first" and "second" memory requests can be used to refer to any two memory requests.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an integrated circuit (IC) is shown. In the illustrated embodiment, IC 100 includes processor complex 110 and coherence point 124. It is noted that IC 100 may also include many other components (e.g., switch fabric, GPU, I/O processor, memory controller, and memory physical interface circuits) not shown in FIG. 1. In various embodiments, IC 100 may also be referred to as a system on chip (SoC), an application specific integrated circuit (ASIC), or an apparatus.

Processor complex 110 may include central processing units (CPUs) 112 and 116, level two (L2) cache 120, and bus interface unit (BIU) 122. CPUs 112 and 116 may also be referred to as processors or cores. In other embodiments, processor complex 110 may include other numbers of CPUs. For example, in another embodiment, processor complex 110 may have a single CPU with a single L1 cache. In a further embodiment, processor complex 110 may have four CPUs and each CPU may have its own L1 cache. It is noted that processor complex 110 may also include other components not shown in FIG. 1.

The CPUs 112 and 116 may include circuitry to execute instructions defined in an instruction set architecture. Specifically, one or more programs comprising the instructions may be executed by CPUs 112 and 116. Any instruction set architecture may be implemented in various embodiments. For example, in one embodiment, the ARM™ instruction set architecture (ISA) may be implemented. Other ISA's may include the PowerPC™ instruction set, the MIPS™ instruction set, the SPARC™ instruction set, the x86 instruction set (also referred to as IA-32), the IA-64 instruction set, etc. Other types of ISA's may also be utilized, including custom-designed or proprietary ISA's.

CPU 112 may include level one (L1) cache 114 and CPU 116 may include L1 cache 118, and L1 caches 114 and 118 may be coupled to L2 cache 120. Other embodiments may include additional levels of cache (e.g., level three (L3) cache). L1 caches 114 and 118 and L2 cache 120 may comprise any capacity and configuration (e.g. direct mapped, set associative). L2 cache 120 may be coupled to memory via BIU 122 and coherence point 124. BIU 122 may include various logic structures to couple CPUs 112 and 116 and L2 cache 120 to various other devices and blocks.

In one embodiment, when a request which misses in L1 cache 114 or L1 cache 118 also misses in L2 cache 120, a fill request may be sent to memory via coherence point 124. When the fill data comes back to L2 cache 120, L2 cache 120 may delay the write of the fill data to the data array of L2 cache 120. Instead, L2 cache 120 may update a tag in the tag array of L2 cache 120 with request attributes and then forward the fill data to the corresponding L1 cache. The L1 cache may set a clean-evict bit upon receiving the fill data, and the clean-evict bit indicates that the L1 cache should write the cache line back to the L2 cache at the time of victimization even if the L1 cache has not altered the cache line.

Coherence point 124 may be configured to act as a gateway between the coherent and non-coherent domains in IC 100. Coherence point 124 may be the location in IC 100 where memory operations become globally visible. Coherence point 124 may also include L2 duplicate tags 126, which are tags from L2 cache 120 and which may be snooped by coherence point 124 for coherency operations. Although not shown in FIG. 1, in some embodiments, coherence point 124 may be coupled to a switch fabric, and coherence point 124 may be coupled to any number and type of devices and other requesting agents via the switch fabric. Coherence point 124 may also include additional logic (e.g., coherence control unit, memory interface unit, coherent memory request table) not shown in FIG. 1. For example, in various embodiments, coherence point 124 may include cache coherency logic employing a cache coherency protocol to ensure data accessed by each agent is kept up to date.

The cache coherency protocol ensures that various copies of the same data (from the same memory location) can be maintained while avoiding "stale data", and by establishing a "global" order of reads/writes to the memory locations by different producers/consumers. If a read follows a write in the global order, the data read reflects the write. Typically, caches will track a state of their copies according to the coherence scheme. For example, the popular Modified, Exclusive, Shared, Invalid (MESI) scheme includes a modified state (the copy is modified with respect to main memory and other copies); an exclusive state (the copy is the only copy other than main memory); a shared state (there may be one or more other copies besides the main memory copy); and the invalid state (the copy is not valid). The MOESI scheme adds an Owned state in which the cache is responsible for providing the data for a request (either by writing back to main memory before the data is provided to the requestor, or by directly providing the data to the requester), but there may be other copies in other caches.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown. Still further, while two instances of a given component may be shown in FIG. 1, other embodiments may include one instance of the given component. In addition, in other embodiments, the connections between components of IC 100 may differ from those shown in FIG. 1. In other words, direct connections between components may be used for components that are not directly connected in FIG. 1, and components with direct connections in FIG. 1 may instead connect via one or more other components.

Figure 2:
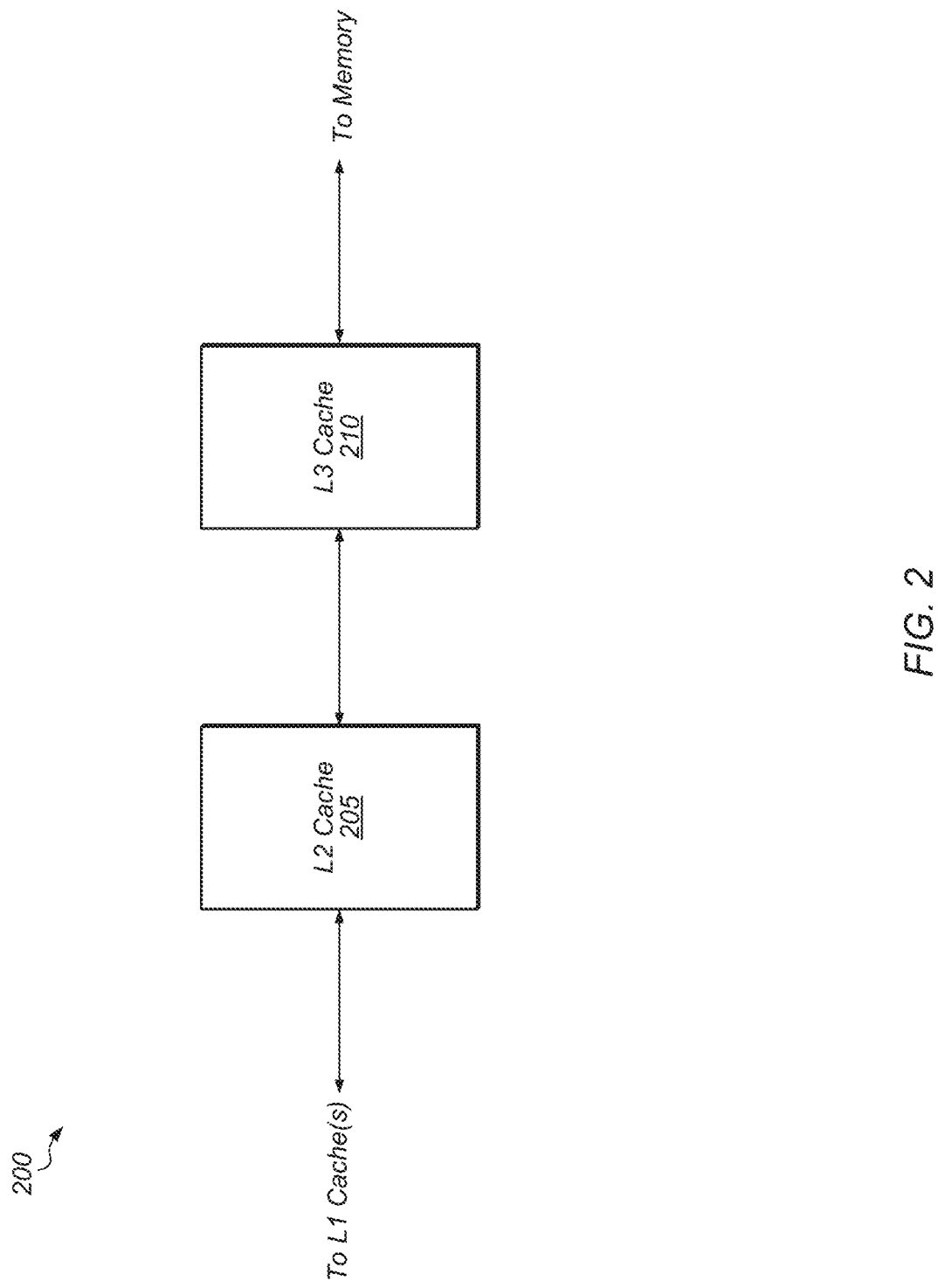
FIG. 2 illustrates one embodiment of a portion of a SoC.

Turning now to FIG. 2, one embodiment of a portion of a SoC is shown. System on chip (SoC) 200 may include L2 cache 205 and L3 cache 210. SoC 200 may also include many other components which are not shown in FIG. 2 to avoid cluttering the figure. It is noted that although L3 cache 210 is shown as being coupled directly to memory, in some embodiments, L3 cache 210 may be coupled to memory via one or more other components (e.g., coherence point, memory controller) not shown in FIG. 2. It is also noted that there may be one or more lower levels of cache coupled between L3 cache 210 and memory. Caches that are closer to a requesting agent (e.g., processor) may be referred to as being higher in the cache hierarchy of SoC 200 than the caches that are farther from the requesting agent. Similarly, caches that are farther from the requesting agent (and closer to memory) may be viewed as being lower in the cache hierarchy. It is further noted that L2 cache 205 may be coupled to one or more L1 caches (not shown). In one embodiment, L3 cache 210 may be inclusive of L2 cache 205.

In one embodiment, L2 cache 205 may receive a memory request (from a L1 cache), and the memory request may miss in L2 cache 205. L2 cache 205 may then send the memory request to L3 cache 210, and a lookup of L3 cache 210 may be performed for this memory request. If the lookup misses in L3 cache 210, then a fill request may be sent to memory (or to another cache). When the fill data returns from memory, L3 cache 210 may delay the writing of the fill data to L3 cache 210. Instead, L3 cache 210 may update a tag in the tag array of L3 cache 210 and then forward the cache line to L2 cache 205. L2 cache 205 may set a clean-evict bit for the cache line to indicate that when L2 cache 205 evicts the cache line, the cache line should be written back to L3 cache 210 regardless of the dirty status of the cache line. For example, if the cache line has not been modified and it's clean-evict bit is set, L2 cache 205 will write back the cache line to L3 cache 210.

Figure 3:
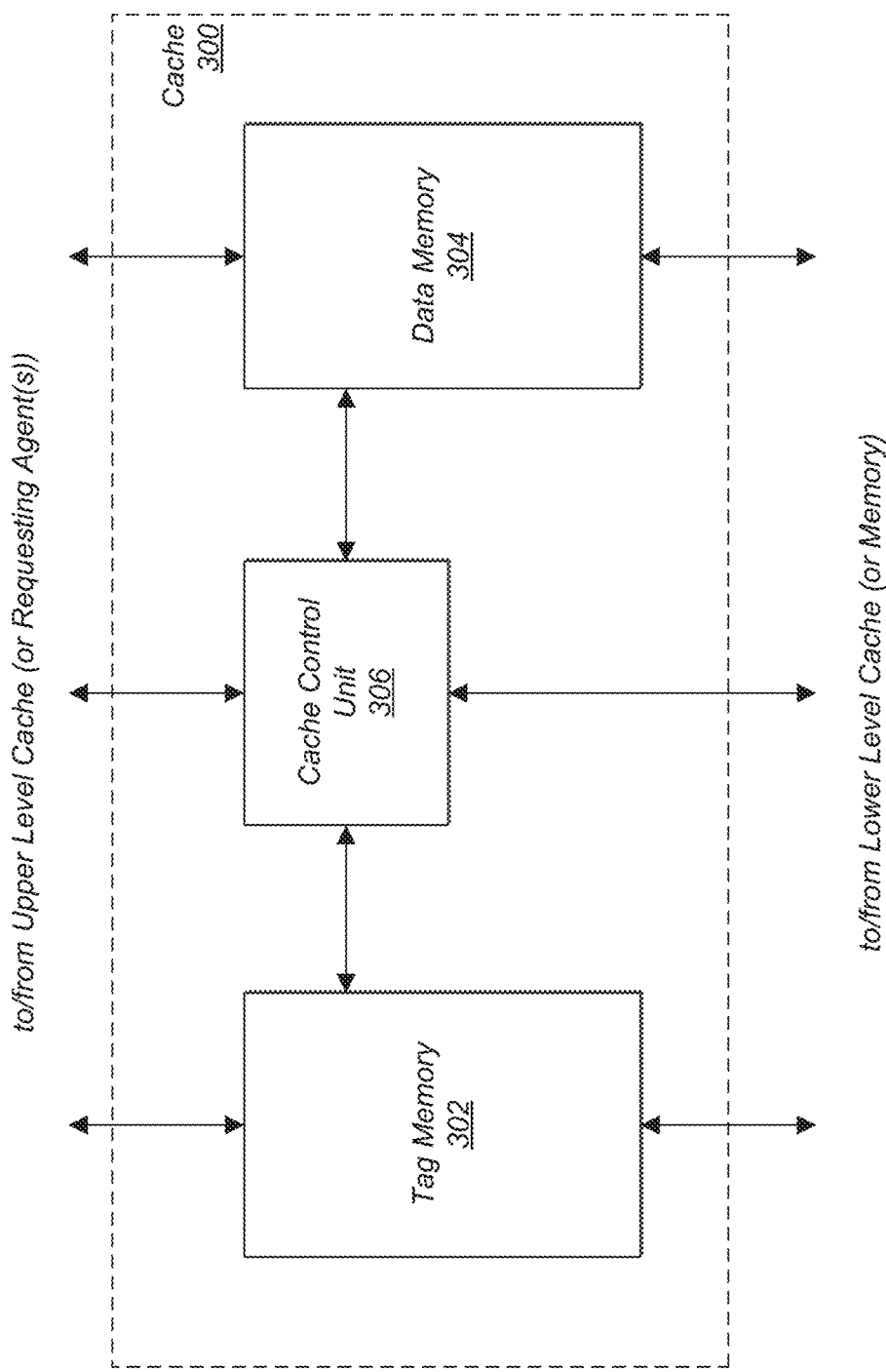
FIG. 3 is a block diagram illustrating one embodiment of a cache.

Referring now to FIG. 3, a block diagram of one embodiment of a cache is shown. Cache 300 may be a L1 cache, L2 cache, L3 cache, or other cache, depending on the embodiment. In one embodiment, cache 300 may include tag memory 302, data memory 304, and cache control unit 306. It is noted that cache 300 may also include other components and logic not shown in FIG. 3. For example, cache 300 may also include arbitration circuitry to arbitrate among requests. It is to be understood that the cache architecture shown in FIG. 3 is merely one possible architecture that may be implemented. In other embodiments, other cache architectures may be utilized with the methods and mechanisms disclosed herein.

In one embodiment, tag memory 302 may be coupled to receive addresses for memory requests from requesting agents (or other caches). Data memory 304 may be coupled to receive data or provide data for memory requests. It is noted that the terms "tag memory" and "tag array" may be used interchangeably herein. Similarly, the terms "data memory" and "data array" may be used interchangeably herein.

In various embodiments, tag memory 302 and data memory 304 may include multiple ways, and each way may be addressable by index. Cache control unit 306 is coupled to tag memory 302 and data memory 304, and cache control unit 306 may be configured to receive various control data related to the received memory requests and to respond to the received control data. It is noted that although cache control unit 306 is shown in FIG. 3 as a single unit, in other embodiments, cache control unit 306 may be split up into multiple units within cache 300.

Data memory 304 may comprise a set of data entries, each having capacity to store a cache line of data. The cache line may be the unit of allocation and deallocation in data memory 304. The cache line may be any desirable size, such as 32 bytes or 64 bytes, although larger and smaller cache line sizes may be supported in other embodiments. In another embodiment, the cache lines of data memory 304 may be referred to as "cache blocks".

In various embodiments, data memory 304 may utilize any type of memory device. In one embodiment, data memory 304 may comprise a RAM, for example, indexed by entry number. Data memory 304 may be arranged so that a set of cache line storage locations may be selected for read/write operation responsive to an index portion of the input address (e.g., a number of bits of the address that may be decoded to uniquely select a set among the number of implemented sets). The cache line storage location that is to be accessed may be identified by the cache control unit 306 (e.g., responsive to detecting a cache hit for a request, responsive to allocating the cache line storage location to store a missing cache line). Data may be read from the accessed cache line storage location to return to the requestor for a read cache hit, or to transmit to the memory (or a lower level cache) for a cache line evicted from cache 300. Data may be written to the accessed cache line storage location for a write cache hit from a requestor or to complete a cache fill of a missing cache line into an allocated cache line storage location. In some embodiments, data memory 304 may be a banked implementation and bank selection control may be provided from the cache control unit 306 as well.

Tag memory 302 may utilize any type of memory device, such as for instance, a RAM. Alternatively, tag memory 302 may comprise a content addressable memory (CAM) for snooping purposes, or a RAM/CAM combination. The tag memory 302 may comprise a plurality of tag entries, each entry selected by a different value of the index mentioned above. The selected tag entry may store the tags that correspond to the set of cache line storage locations in cache 300 that are selected by the index. Each tag corresponds to a cache line in the respective cache line storage location, and may include the tag portion of the address of the corresponding cache line (i.e., the address, less the least significant bits that define an offset within the cache line and the bits that are used for the index), and various other state information.

In response to a request, the tag memory 302 may be configured to decode the index and output the tags to the cache control unit 306 for processing. In an embodiment, the tag memory 302 may also include tag comparison circuitry configured to compare the tags to the tag portion of the request address, and may provide the comparison results to the cache control unit 306. In another embodiment, the cache control unit 306 may compare the tags. The cache control unit 306 may also be configured to perform various tag updates by writing the tag entry.

Cache 300 may have any configuration. In some embodiments, a direct mapped or set associative configuration may be implemented. In typical direct mapped and set associative caches, there is a preconfigured, one-to-one correspondence between tag entries and data entries. In a direct mapped configuration, each address maps to one possible entry (tag memory 302 and data memory 304) in cache 300, at which the corresponding cache line would be stored. In one embodiment, cache 300 may be associative, in which a given address maps to two or more cache line storage locations in the data memory 304 that may be eligible to store the cache line. Cache 300 may be set associative, in which each address maps to two or more possible entries (dependent on the associativity of the cache). In one embodiment, N cache line storage locations are mapped to addresses having the same value in a subset of the address bits referred to as an index, where N is an integer greater than one and less than the total number of cache line storage locations in data memory 304. The N cache line storage locations forming a set corresponding to a given index are often referred to as "ways". Other embodiments may be fully associative, in which any cache line storage location may be mapped to any address.

Cache control unit 306 may dynamically allocate a data entry in data memory 304 to store data for a memory request received by cache 300. The memory request may be a write to memory, for example. The memory request may also be a read completion (with data) provided from the memory (not shown) in response to a read previously received from a requesting agent and targeting the memory.

Tag memory 302 may be configured to store various tags for the cache lines cached in the cache 300. For example, in one embodiment, the tags may include a clean-evict bit, the coherence state, a dirty indicator, least recently used (LRU) data, a group identification (ID), a requesting agent ID, and/or other data. The clean-evict bit indicates if the corresponding cache line should be written back to a lower-level cache when the cache line is evicted, regardless of the clean/dirty status of the cache line. Depending on the embodiment, some or all of these tags may be included in each entry of tag memory 302. It is noted that in some embodiments, not all of the caches in a system may utilize clean-evict bits in their tags. For example, in one embodiment, each L1 cache may include a clean-evict bit for each tag in the tag memory, while the tags for the L2 cache may not include clean-evict bits.

Figure 4:
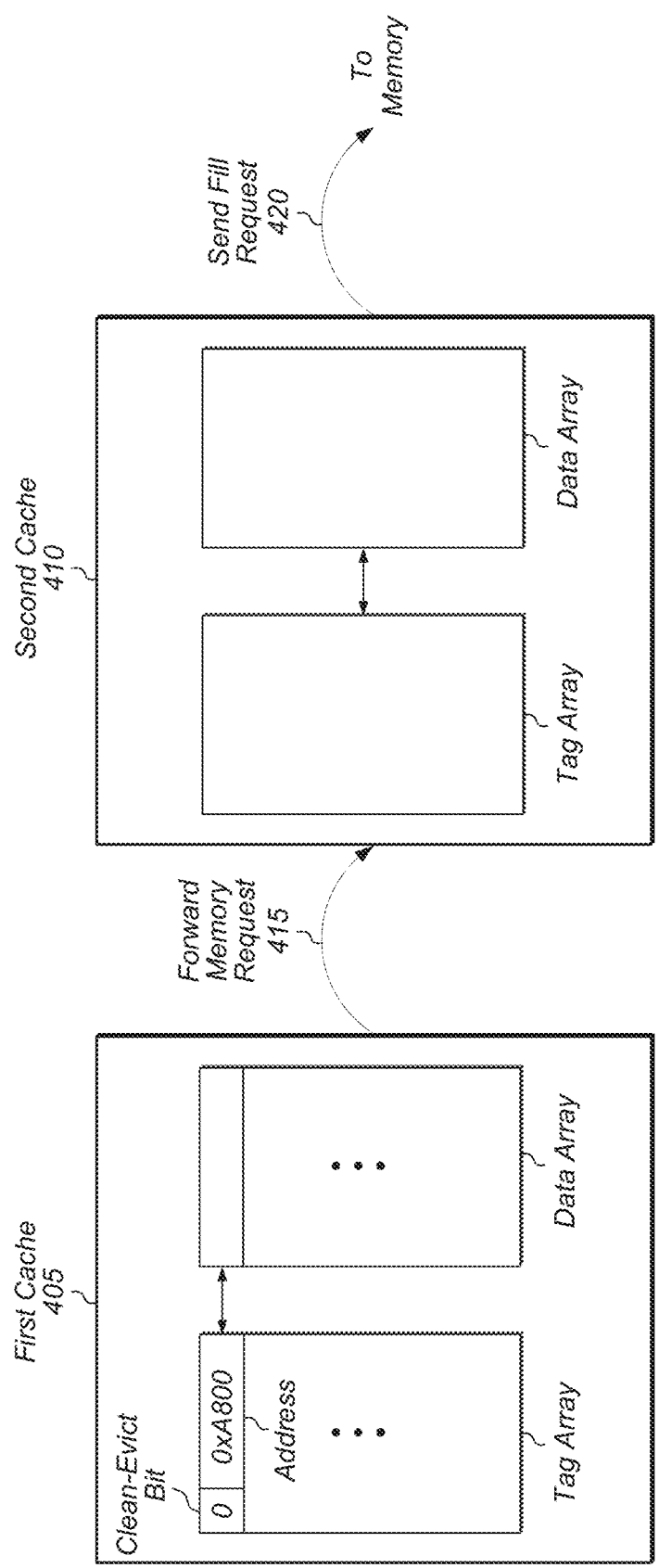
FIG. 4 is a block diagram illustrating one embodiment of caches processing a memory request.

Turning now to FIG. 4, a block diagram of one embodiment of caches processing a memory request is shown. In one embodiment, a requesting agent may generate a memory request and convey the memory request to first cache 405. Depending on the embodiment, the requesting agent may be a processor core, GPU, fixed function circuitry, a logical entity such as a process or thread executing on a processor, or other device. In the example shown in FIG. 4, the tag portion of the address of the memory request is shown as 0xA800, although this is used merely for illustrative purposes. Other embodiments may use other tag address sizes. In one embodiment, first cache 405 may be a L1 cache and second cache 410 may be a L2 cache, and second cache 410 may be inclusive of first cache 405. In other embodiments, first cache 405 and second cache 410 may be other types of caches. The control units and other logic of first cache 405 and second cache 410 are not shown to avoid cluttering the figure.

It may be assumed for the purposes of this discussion that the lookup for address 0xA800 has missed in first cache 405. First cache 405 may allocate a cache line storage location in the data array and a tag in the tag array for address 0xA800. The tag also includes a clean-evict bit which is currently set to 0. The tags may also include various other fields which are not shown to avoid cluttering the figure. In response to the miss for the received memory request, first cache 405 may convey the memory request to second cache 410, and this is shown as arrow 415. It may also be assumed for the purposes of this discussion that the memory request for address 0xA800 has also missed in second cache 410. As a result, second cache 410 may send a fill request to memory (or alternatively to a lower level of the cache hierarchy) as is shown by arrow 420.

Figure 5:
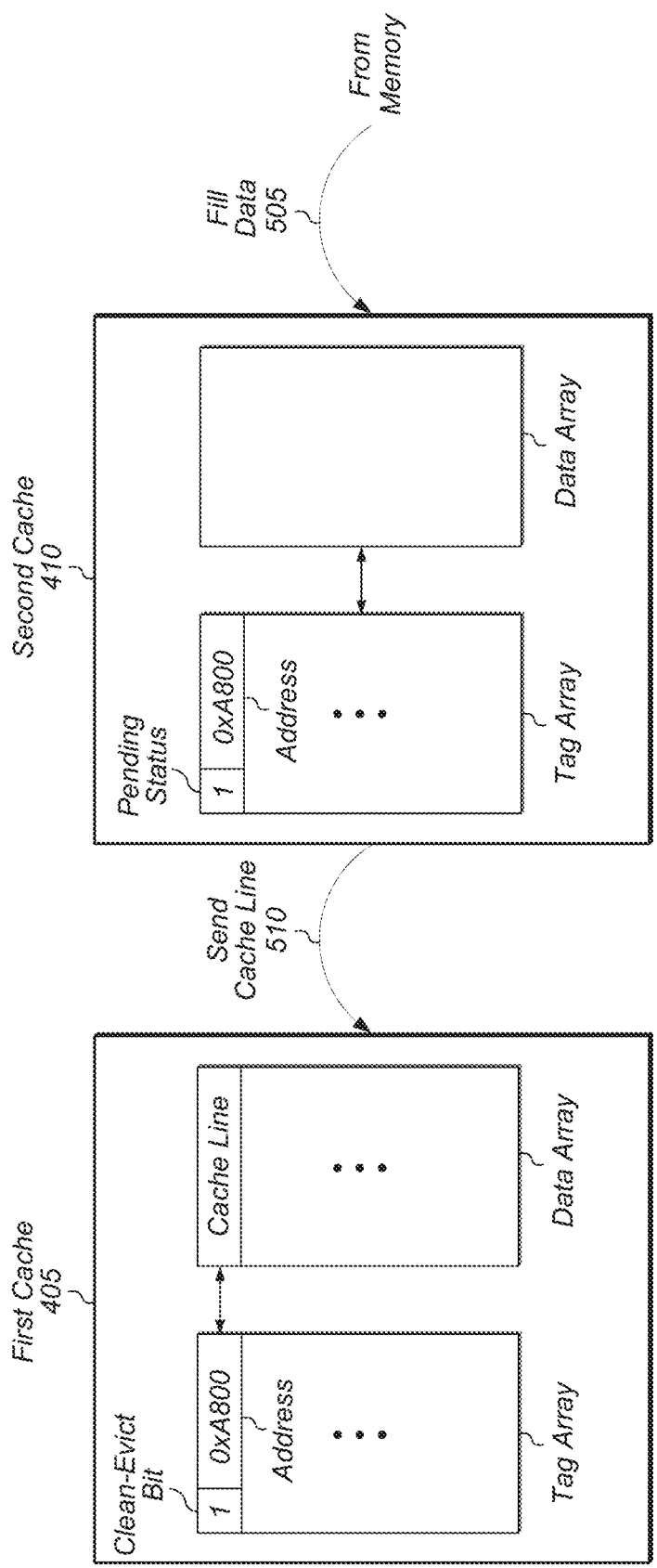
FIG. 5 is a block diagram illustrating one embodiment of processing a cache fill.

Referring now to FIG. 5, one embodiment of processing a cache fill is shown. The example shown in FIG. 5 is a continuation of the example shown in FIG. 4. A fill request was sent to memory in the example shown in FIG. 4, and at a later point in time, the fill data corresponding to the fill request will be returned from memory, as is indicated by arrow 505. In one embodiment, the cache line may be returned in an exclusive state. In other embodiments, the cache line may be returned in another state that provides write permissions.

In response to receiving the cache line, second cache 410 may delay the writing of the cache line to the data array of second cache 410. Instead, second cache 410 may update a tag entry in the tag array so as to maintain coherency. The tag entry may include the tag portion of the address (0xA800), a pending status, and one or more other status indicators (not shown). The pending status indicates that the corresponding cache line has not yet been written but will be written later when the cache line is evicted from first cache 405. Then, second cache 410 may send the cache line to first cache 405, as indicated by arrow 510. Second cache 410 may also send a notification to first cache 405 that the clean-evict bit should be set for this cache line. In response to receiving the cache line, first cache 405 may store the cache line in the data array of first cache 405. First cache 405 may also set the clean-evict bit in the tag corresponding to this cache line. The clean-evict bit indicates that first cache 405 must write the cache line back to second cache 410 when the cache line is evicted even if the cache line has not been altered.

Figure 6:
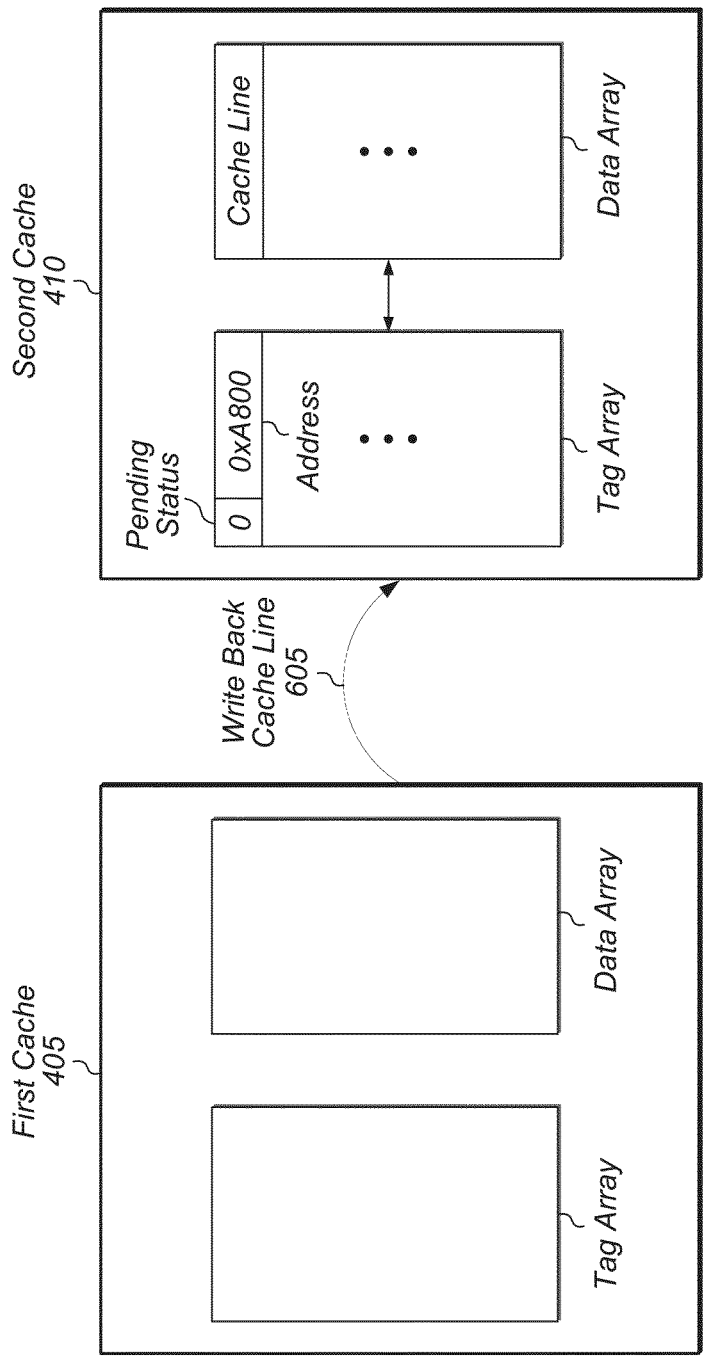
FIG. 6 is a block diagram illustrating one embodiment of a cache line eviction.

Turning now to FIG. 6, one embodiment of a cache line eviction is shown. The example shown in FIG. 6 is a continuation of the examples shown in FIGS. 4 and 5. In the example shown in FIG. 6, first cache 405 has decided to evict the cache line corresponding to address 0xA800. Since the clean-evict bit is set for this cache line, first cache 405 may write back this cache line to second cache 410 even if the cache line has not been dirtied. The cache line is written back to second cache 410 as shown by arrow 605.

When the cache line is received by second cache 410, second cache 410 may write it to the cache line location corresponding to the tag for address 0xA800. The pending status of this tag may also be cleared now that the cache line has been written to the corresponding location in the data array. The eviction of the cache line from first cache 405 will be the first time that second cache 410 is writing the cache line to its data array. This ultimately saves power for second cache 410 because second cache 410 does not have to write the cache line to the data array of second cache 410 twice.

Figure 7:
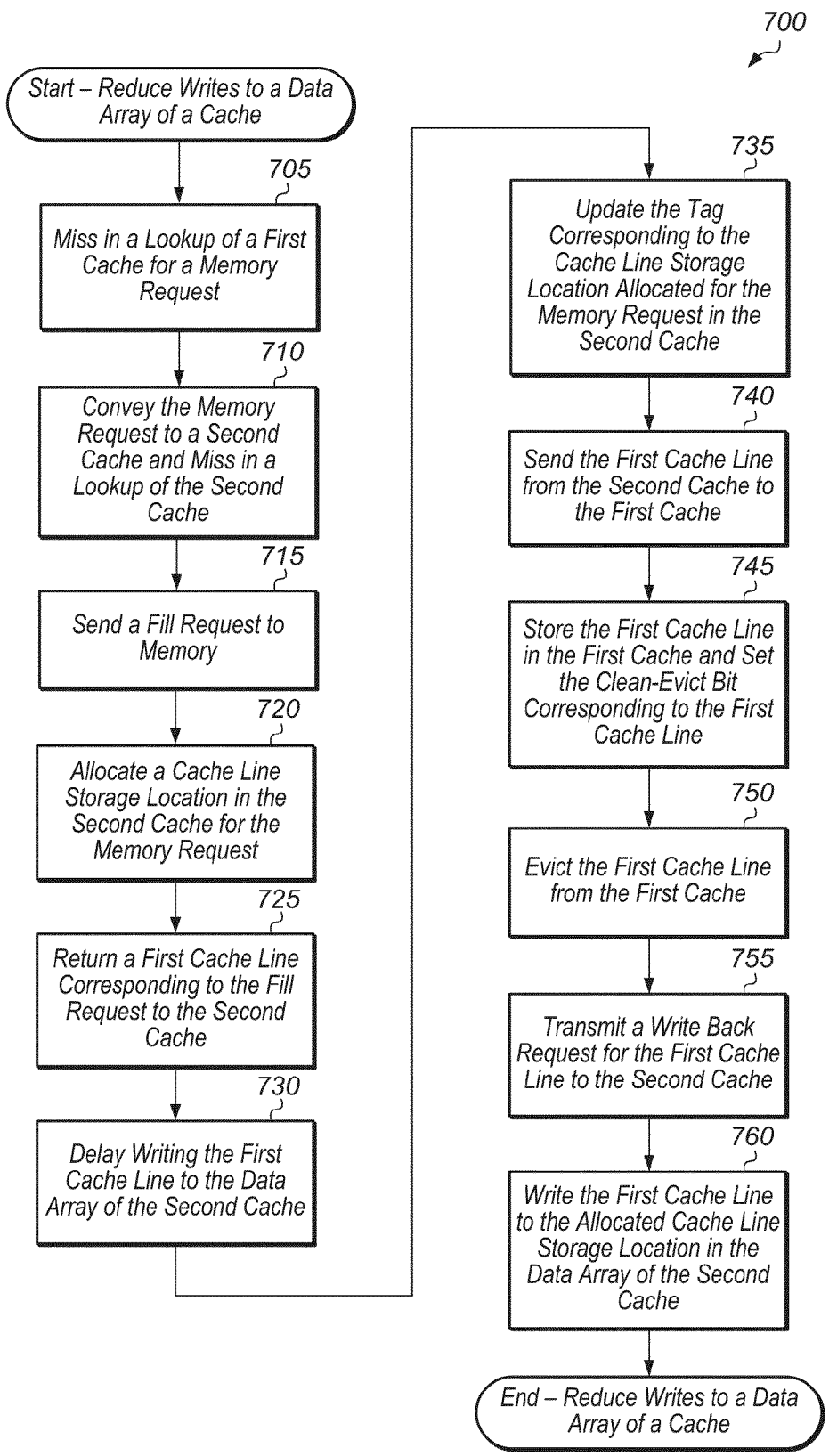
FIG. 7 is a generalized flow diagram illustrating one embodiment of a method for reducing writes to a data array of a cache.

Referring now to FIG. 7, one embodiment of a method 700 for reducing writes to a data array of a cache is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Blocks may be performed in parallel in combinatorial logic circuitry in any of the caches or cache control units described herein. Blocks, combinations of blocks, and/or the flowchart as a whole may be pipelined over multiple clock cycles. Any cache or cache control unit described herein may be configured to implement the operations shown in FIG. 7.

A memory request generated by a requesting agent may miss in a lookup of a first cache (block 705). In one embodiment, the first cache may be a L1 cache. In other embodiments, the first cache may be other types of caches within a multi-level cache hierarchy. In one embodiment, the memory request may be generated by a processor core. In other embodiments, the memory request may be generated by other requesting agents.

Next, the memory request may be conveyed to a second cache and the memory request may miss in a lookup of the second cache (block 710). In one embodiment, the second cache may be a L2 cache. In other embodiments, the second cache may be other types of caches within a multi-level cache hierarchy. In response to the miss in the second cache, a fill request may be sent to memory (block 715). Alternatively, the fill request may be sent from the second cache to a third cache. For example, if there is a lower level cache in the cache hierarchy below the second cache, the fill request may be sent to this lower level cache. Or, in another example, if the second cache is a L2 cache, and the system includes multiple L1 caches, the data for the fill request may be provided by another L1 cache if the requested data is stored in another L1 cache. Also in response to the miss in the second cache, the second cache may allocate a cache line storage location for the memory request (block 720).

At a subsequent point in time, a first cache line corresponding to the fill request may be returned to the second cache (block 725). In one embodiment, the first cache line may be returned to the second cache in a modifiable state. In response to receiving the first cache line, the second cache may delay writing the first cache line to the data array of the second cache (block 730). Rather, the second cache may update the tag corresponding to the cache line storage location allocated for the memory request (block 735). By not writing the first cache line upon receiving it, the second cache will end up saving power if the first cache line is modified by the first cache, since in this case, the second cache would have to write the modified first cache line again when the first cache line is evicted from the first cache. Next, the second cache may send the first cache line to the first cache (block 740). The second cache may also notify the first cache that the first cache line has not been written to the second cache. In response, the first cache may store the first cache line in an allocated cache line storage location and set the clean-evict bit corresponding to this cache line storage location (block 745). The clean-evict bit indicates that the first cache needs to write the first cache line back to the second cache when the first cache line is evicted, even if the first cache line has not been modified.

At a later point in time, the first cache may evict the first cache line from the first cache (block 750). In response to evicting the first cache line and determining the clean-evict bit is set for the first cache line, the first cache may transmit a write back request for the first cache line to the second cache (block 755). In response to receiving the first cache line from the first cache, the second cache may write the first cache line to the allocated cache storage location in its data array (block 760). The write to the data array for this cache line in block 760 will be the first write of the first cache line to the second cache, saving power by not performing two separate writes (e.g., once on the fill and once on the evict) of the first cache line to the second cache.

Figure 8:
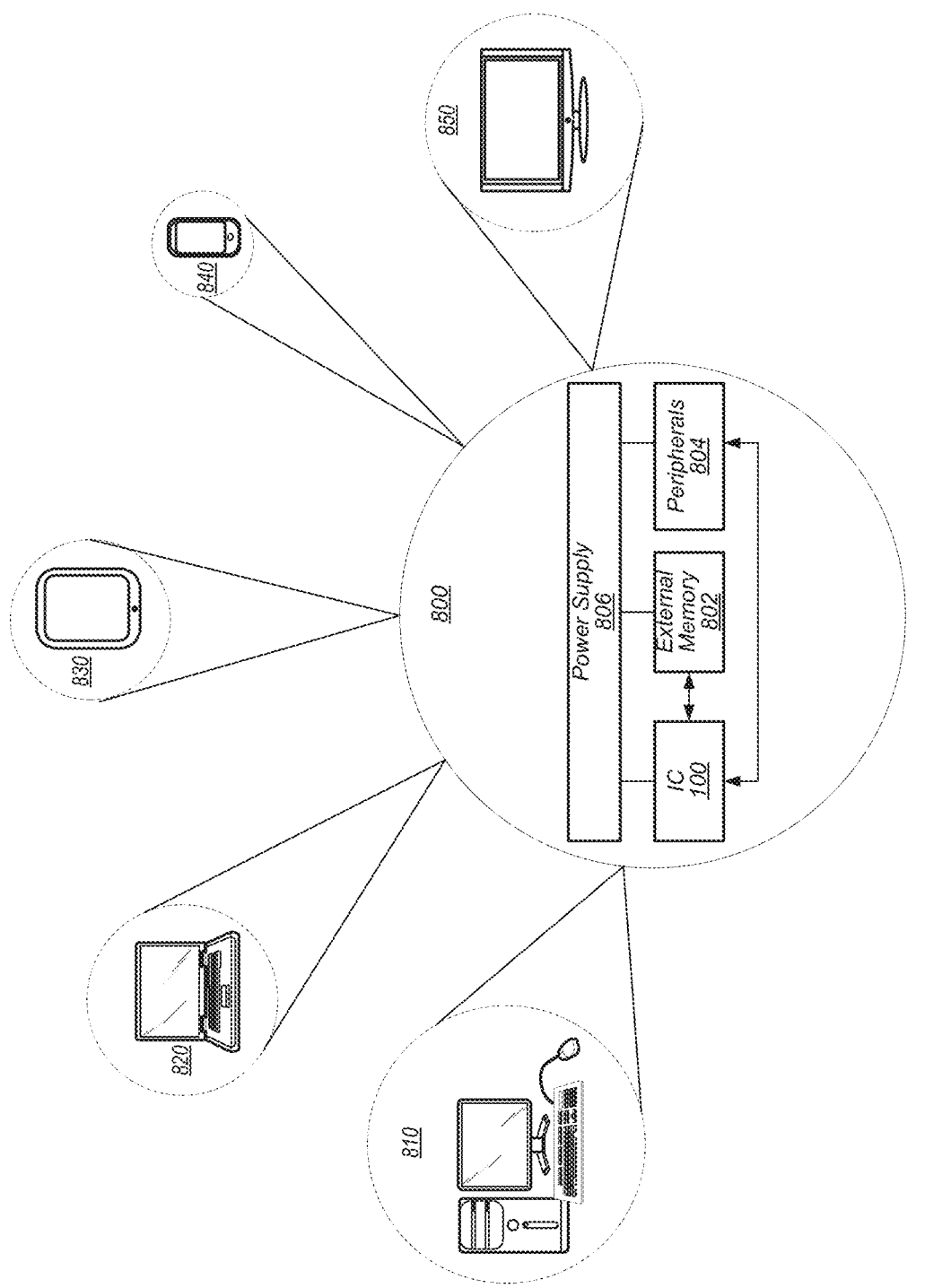
FIG. 8 is a block diagram of one embodiment of a system.

Referring next to FIG. 8, a block diagram of one embodiment of a system 800 is shown. As shown, system 800 may represent chip, circuitry, components, etc., of a desktop computer 810, laptop computer 820, tablet computer 830, cell phone 840, television 850 (or set top box configured to be coupled to a television), or otherwise. Other devices are possible and are contemplated. In the illustrated embodiment, the system 800 includes at least one instance of IC 100 (of FIG. 1) coupled to an external memory 802. Alternatively, system 800 may include one instance of SoC 200 (of FIG. 2).

IC 100 is coupled to one or more peripherals 804 and the external memory 802. A power supply 806 is also provided which supplies the supply voltages to IC 100 as well as one or more supply voltages to the memory 802 and/or the peripherals 804. In various embodiments, power supply 806 may represent a battery (e.g., a rechargeable battery in a smart phone, laptop or tablet computer). In some embodiments, more than one instance of IC 100 or SoC 200 may be included (and more than one external memory 802 may be included as well).

The memory 802 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 100 in a chip-on-chip configuration, a package-on-package configuration, or a multi-chip module configuration.

The peripherals 804 may include any desired circuitry, depending on the type of system 800. For example, in one embodiment, peripherals 804 may include devices for various types of wireless communication, such as wifi, Bluetooth, cellular, global positioning system, etc. The peripherals 804 may also include additional storage, including RAM storage, solid state storage, or disk storage. The peripherals 804 may include user interface devices such as a display screen, including touch display screens or multitouch display screens, keyboard or other input devices, microphones, speakers, etc.

Figure 9:
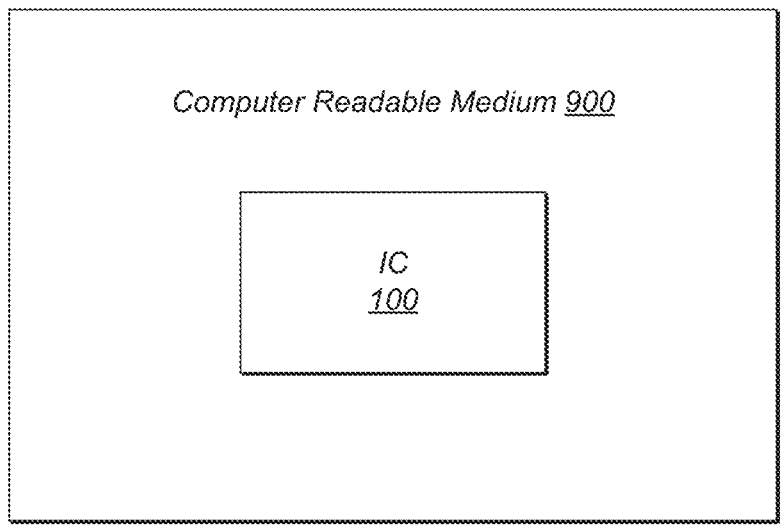
FIG. 9 is a block diagram of one embodiment of a computer readable medium.

Referring now to FIG. 9, one embodiment of a block diagram of a computer readable medium 900 including one or more data structures representative of the circuitry included in IC 100 (of FIG. 1) is shown. Alternatively, computer readable medium 900 may include one or more data structures representative of the circuitry included in SoC 200 (of FIG. 2). Generally speaking, computer readable medium 900 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 900 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 900 may be the netlist(s) (with or without the synthesis library) or the data set(s), as desired. In yet another alternative, the data structures may comprise the output of a schematic program, or netlist(s) or data set(s) derived therefrom.

While computer readable medium 900 includes a representation of IC 100, other embodiments may include a representation of any portion or combination of portions of IC 100 and/or SoC 200 (e.g., cache control unit).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a first cache; and
a second cache, wherein the second cache is inclusive of the first cache;
wherein the first cache is configured to convey a first memory request to the second cache responsive to detecting a miss for the first memory request in the first cache;
wherein the second cache is configured to:
issue a fill request responsive to detecting a miss for the first memory request in the second cache;
receive a first cache line corresponding to the fill request;
convey the first cache line to the first cache; and
delay writing the first cache line to the second cache until the first cache line is evicted from the first cache.

2. The system as recited in claim 1, wherein the second cache comprises a data array and a tag array, wherein the second cache is further configured to update a first tag in the tag array with attributes corresponding to the first memory request responsive to receiving the first cache line.

3. The system as recited in claim 1, wherein the first cache line is received by the second cache in an exclusive state.

4. The system as recited in claim 1, wherein the first cache comprises a data array and a tag array, and wherein responsive to receiving the first cache line from the second cache, the first cache is configured to:
write the first cache line to a first cache line storage location allocated in the data array; and
set a clean-evict bit in a first tag corresponding to the first cache line storage location, wherein the clean-evict bit indicates the first cache should write back the first cache line to the second cache when the first cache line is evicted regardless of a dirty status of the first cache line.

5. The system as recited in claim 1, wherein the first cache is a level one (L1) cache, and wherein the second cache is a level two (L2) cache.

6. The system as recited in claim 1, wherein the first cache is a level two (L2) cache, and wherein the second cache is a level three (L3) cache.

7. The system as recited in claim 1, wherein the second cache is at a lower level of a cache hierarchy than the first cache.

8. An apparatus comprising:
a first cache; and
a second cache, wherein the second cache is at a lower level of a cache hierarchy than the first cache, and wherein the second cache is configured to:
receive a first memory request from the first cache;
detect a miss for the first memory request in the second cache;
issue a fill request corresponding to the first memory request;
receive a first cache line corresponding to the fill request;
convey the first cache line to the first cache; and
delay writing the first cache line to the second cache until the first cache line is evicted from the first cache.

9. The apparatus as recited in claim 8, wherein the first memory request corresponds to a first memory request generated by a first requesting agent.

10. The apparatus as recited in claim 9, wherein the first requesting agent is a processor core.

11. The apparatus as recited in claim 9, wherein the first requesting agent is a graphics processing unit (GPU).

12. The apparatus as recited in claim 8, wherein the first cache line is received by the second cache with write permissions.

13. The apparatus as recited in claim 8, wherein the second cache is further configured to notify the first cache that the first cache line has not been written to the second cache.

14. The apparatus as recited in claim 8, wherein the second cache is inclusive of the first cache.

15. The apparatus as recited in claim 14, further comprising a third cache, wherein the third cache is a level one (L1) cache, and wherein the second cache is inclusive of the third cache.

16. A method comprising:
conveying a first memory request from a first cache to a second cache, wherein the second cache is inclusive of the first cache;
issuing a fill request responsive to detecting a miss for the first memory request in the second cache;
receiving a first cache line at the second cache corresponding to the fill request, wherein the first cache line is received in an exclusive state;
conveying the first cache line to the first cache; and
delay writing the first cache line to the second cache until the first cache line is evicted from the first cache.

17. The method as recited in claim 16, wherein the first cache line is received from a memory.

18. The method as recited in claim 16, wherein the first cache line is received from a third cache.

19. The method as recited in claim 16, wherein responsive to receiving the first cache line at the first cache, the method further comprising:
writing the first cache line to a data array of the first cache; and
setting a clean-evict bit in a first tag in a tag array of the first cache, wherein the first tag corresponds to the first cache line.

20. The method as recited in claim 19, further comprising:
evicting the first cache line from the first cache, wherein the first cache line has not been modified; and
writing the first cache line to the second cache responsive to detecting the clean-evict bit of the first tag is set.

* * * * *